US009618321B2

(12) United States Patent
Motohashi et al.

(10) Patent No.: US 9,618,321 B2
(45) Date of Patent: Apr. 11, 2017

(54) INTERFERENCE MEASURING DEVICE

(71) Applicant: MITUTOYO CORPORATION, Kanagawa (JP)

(72) Inventors: Ken Motohashi, Kanagawa (JP); Atsushi Usami, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/679,236

(22) Filed: Apr. 6, 2015

(65) Prior Publication Data

US 2015/0285619 A1    Oct. 8, 2015

(30) Foreign Application Priority Data

Apr. 8, 2014   (JP) .................................. 2014-079593

(51) Int. Cl.
*G01B 11/02* (2006.01)
*G01B 9/02* (2006.01)
*G01B 11/00* (2006.01)

(52) U.S. Cl.
CPC ....... *G01B 9/0203* (2013.01); *G01B 9/02028* (2013.01); *G01B 11/005* (2013.01); *G01B 2290/65* (2013.01)

(58) Field of Classification Search
CPC ............ G01B 11/0608; G01B 11/0675; G01B 11/2441; G01B 9/0203; G01B 9/02083; G01B 9/02028; G01B 9/0209; G01B 9/02091
USPC ........................................................ 356/516
See application file for complete search history.

(56) References Cited

U.S. PATENT DOCUMENTS

| 5,501,226 A * | 3/1996 | Petersen ............... A61B 3/1233 356/28.5 |
| 2007/0252999 A1* | 11/2007 | Hogan ................. A61B 5/0066 356/450 |
| 2009/0262361 A1* | 10/2009 | Tanioka ............... A61B 5/0066 356/479 |
| 2011/0032504 A1* | 2/2011 | Sasaki ................ G01B 11/2441 355/72 |

(Continued)

FOREIGN PATENT DOCUMENTS

JP    2011-191118    9/2011

*Primary Examiner* — Michael A Lyons
*Assistant Examiner* — Jonathon Cook
(74) *Attorney, Agent, or Firm* — Greenblum & Bernstein, P.L.C.

(57) ABSTRACT

An interference measuring device comprises: a light source; a beam splitter that causes the light to diverge into a reference optical path and a measurement optical path and that outputs a combined wave in which reflection light passed the reference optical path and reflection light passed the measurement optical path are combined; a reference light diverging part that causes the light diverged into the reference optical path, to further diverge into a plurality of optical paths and that causes reflection light beams respectively passed the optical paths to be input into the beam splitter; and a plurality of reference mirrors that are respectively arranged in the optical paths such that optical path lengths of the optical paths are different from each other, and that reflect reference light. An interference image is imaged by varying the optical path length of either the reference optical path or the measurement optical path.

5 Claims, 11 Drawing Sheets

(56) References Cited

U.S. PATENT DOCUMENTS

2011/0222069 A1\* 9/2011 Nagahama ......... G01B 9/02057
356/496
2015/0338202 A1\* 11/2015 Xiang ................ G01B 9/02028
356/477

\* cited by examiner

INTERFERENCE MEASURING DEVICE

CROSS-REFERENCE TO RELATED APPLICATION

This non-provisional application claims priority under 35 U.S.C. §119(a) from Japanese Patent Application No. 2014-079593, filed on Apr. 8, 2014, the entire contents of which are incorporated herein by reference.

BACKGROUND OF THE INVENTION

Field of the Invention

The present invention relates to an interference measuring device that performs measurement, which makes use of brightness information of the interference fringes generated by the interference of light.

Description of the Related Art

Conventionally, interference measuring devices, such as three-dimensional shape measuring devices that measure, for example, the three-dimensional shape of a measuring object in a precise manner by making use of brightness information of the interference fringes generated by the interference of light, are known.

For example, in an interference measuring device that makes use of a white-light light source, at a focused positon where the optical path lengths of a reference optical path and a measurement optical path match each other, the peaks of the interference fringes of the respective wavelengths are superimposed onto each other and the brightness of the combined interference fringes increases. Accordingly, in the interference measuring device, by capturing, with an imaging element such as a CCD camera or the like, an interference image that indicates a two-dimensional distribution of the interference light intensities while varying the optical path length of the reference optical path or the measurement optical path, and, by detecting a focused position at which the interference light intensities reach their peaks at the respective measurement positions within a capturing field of view, it is possible to measure a height of a measurement surface in a corresponding measurement position and thus a three-dimensional shape or the like of the measuring object (see, for example, JP2011-191118A).

SUMMARY OF THE INVENTION

In the interference measuring device such as described above, since brightness variation of interference light occurs at a cycle of approximately the wavelength of the light that generates the interference, it is necessary to repeat the capturing of interference images while varying the optical path length of the reference light optical path or the measurement optical path at intervals sufficiently finer than that of the wavelength. For this reason, if the measurement range in the vertical direction is extended, the number of interference images to be captured would become enormous and thus, it was difficult to reduce the measurement time.

Accordingly, it is an object of the present invention to provide an interference measuring device which is capable of overcoming the problem described above and of reducing the measurement time by narrowing the movement range in the Z-axis direction of the interference image.

In order to overcome the above problem, the interference measuring device according to the present invention comprises: a light source that outputs light; a first beam splitter that causes the light output from the light source to diverge into a reference optical path and a measurement optical path and that outputs a combined wave in which reflection light that has passed through the reference optical path and reflection light that has passed through a measuring object arranged in the measurement optical path are combined; a reference light diverging part that is arranged in the reference optical path, that causes the light which is diverged into the reference optical path by the first beam splitter to further diverge into a plurality of optical paths, and that causes reflection light beams that have respectively passed through the plurality of optical paths to be input into the first beam splitter as the reflection light that has passed through the reference optical path; a plurality of reference mirrors that are respectively arranged in the plurality of optical paths such that optical path lengths of the plurality of optical paths are different from each other, and that reflect reference light which is diverged by the reference light diverging part; an optical path length varying part that varies an optical path length of either the reference optical path or the measurement optical path; an imaging part that images, by means of a two-dimensionally arranged plurality of light receiving elements, an interference image that shows a two-dimensional distribution of interference light intensities in the combined wave; and a height calculation part that determines a height of a measurement surface of the measuring target based on a plurality of interference images imaged by the imaging part at a plurality of optical path lengths which are varied by the optical path varying part. Based on such configuration, the variable range which is variable by the optical path length varying part can be made narrower than the measurement range in the vertical direction and thus, the number of interference images to be captured may be reduced and the measurement time may also therefore be reduced. It should be noted that the phrase "measurement surface of a measuring object" refers to a surface of the measuring object from which measurement light is reflected.

In the present invention, the reference light diverging part may be configured as a second beam splitter that causes the light which is diverged into the reference optical path by the first beam splitter to further diverge into a plurality of optical paths, that combines reflection light beams that have respectively passed through the plurality of optical paths, and that inputs the combined reflection light beams into the first beam splitter. In addition, in the present invention, the reference light diverging part may be configured as a drive mirror that is capable of changing an angle thereof so as to sequentially reflect the light which is diverged into the reference optical path by the first beam splitter toward each of the plurality of reference mirrors. Based on these configurations, the reference light diverged by the first beam splitter is distributed to a plurality of reference mirrors and the reflection light beams returning from the plurality of reference mirrors can be returned to the first beam splitter.

In the configuration where the drive mirror is employed, the drive mirror changes the angle thereof so as to reflect the light which is diverged into the reference optical path by the first beam splitter toward all of the plurality of reference mirrors during one cycle in which the imaging part repeatedly images the interference images. Based on such configuration, the interference fringes generated by the reflection light beams from all the reference mirrors can be imaged at one time.

In the present invention, the height calculation part discerns as to from which one of the plurality of reference mirrors comes the reflection light that generates interference fringes that appear in the interference image, based on an optical path length set by the optical path length varying part. In addition, in the present invention, the height calculation part discerns as to from which one of the plurality of reference mirrors comes the reflection light that generates interference fringes that appear in the interference image, based on a contrast of the interference fringes. Moreover, in the present invention, concerning each interference fringe appearing on the interference image, the height calculation part recognizes as to from which one of the plurality of reference mirrors the reflection light comes, based on the bright-dark cycle of the corresponding interference fringe. Based on such configuration, it is possible to discern as to from which reference mirror comes the reflection light that generates the interference fringes.

DETAILED DESCRIPTION OF THE EMBODIMENTS

[First Embodiment]

Hereinafter, a measuring device in which an interference optical system and an image measuring device are combined, wherein such measuring device is a first embodiment of an interference measuring device according to the present invention, will be described with reference to the drawings.

Figure 1:
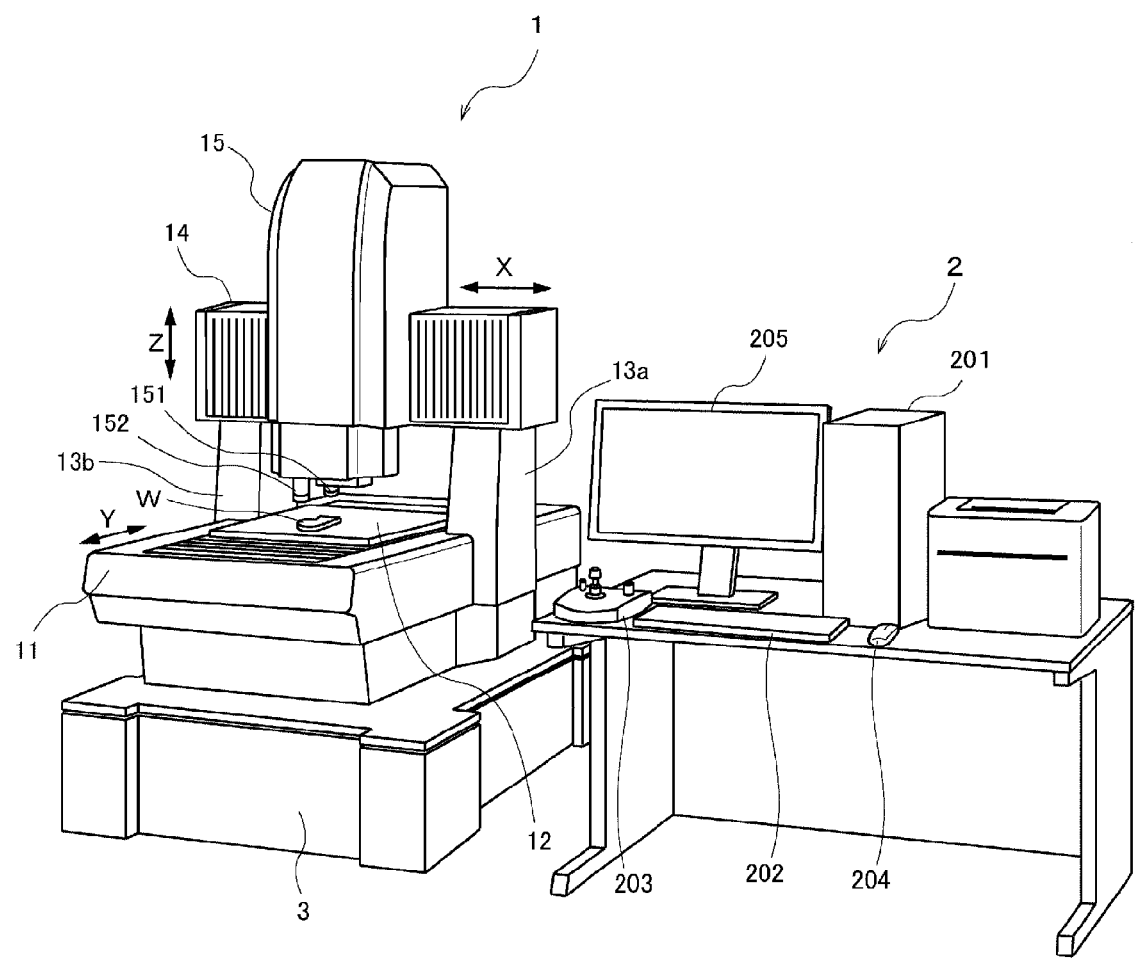
FIG. 1 is a perspective view showing the overall configuration of a measuring device in which an interference optical system and an image measuring device are combined, wherein such measuring device is a first embodiment of an interference measuring device.

FIG. 1 is a perspective view showing the overall configuration of the measuring device, in which the interference optical system and the image measuring device are combined, according to the first embodiment. The measuring device in which the interference optical system and the image measuring device are combined is provided with a non-contact image measuring instrument 1 and a computer system 2 that drive-controls the image measuring instrument 1 and carries out required data processing. It should be noted that the measuring device in which the interference optical system and the image measuring device are combined may also be provided, in addition to the above, with a printer for printing out measurement results or the like as needed.

The measuring device in which the interference optical system and the image measuring device are combined is provided with a mount 11, a sample table (stage) 12, support arms 13a and 13b, an X-axis guide 14 and an imaging unit 15. As shown in FIG. 1, the measuring device is arranged on a vibration isolation table 3 which is placed on the floor. The vibration isolation table 3 prevents the vibration of the floor from being propagated to the measuring device on the table. The vibration isolation table 3 maybe an active type or a passive type. The mount 11 is arranged on the table top of the vibration isolation table 3. Then, on the mount 11, the stage 12 having a measuring object (work piece) W placed thereon is placed such that a top surface thereof coincides, as a base surface, with a horizontal surface. The stage 12 is driven in a Y-axis direction by means of a Y-axis drive mechanism, which is not shown. The Y-axis drive mechanism enables the work piece W to move in the Y-axis direction with respect to the imaging unit. The upwardly extending support arms 13a and 13b are fixed at central parts on both side edges of the mount 11. The X-axis guide 14 is fixed so that both top end parts of the support arms 13a and 13b are connected to each other. The X-axis guide 14 supports the imaging unit 15. The imaging unit 15 is driven, along the X-axis guide 14, by means of an X-axis mechanism, which is not shown.

The imaging unit 15 is provided, in a removable manner, with an image optical head 151 that images a two-dimensional image of the work piece W and an interference optical head 152 that measures a three-dimensional shape of the work piece W through interference measurement. The imaging unit 15 measures the work piece, at a measurement position set by the computer system 2, using either head. The measurement field of view of the image optical head 151 is typically set larger than the measurement field of view of the interference optical head 152. Both heads can be used in a switching manner, in accordance with control by the computer system 2. The image optical head 151 and the interference optical head 152 are supported by a common support plate so that a certain positional relationship is maintained therebetween and are pre-calibrated so that no coordinate axes change occurs between prior to and after the switching.

The image optical head 151 is provided with a CCD camera, an illumination device, a focusing mechanism and the like, and captures a two-dimensional image of the work piece W. The data of such captured two-dimensional image is then taken into the computer system 2.

Figure 2:
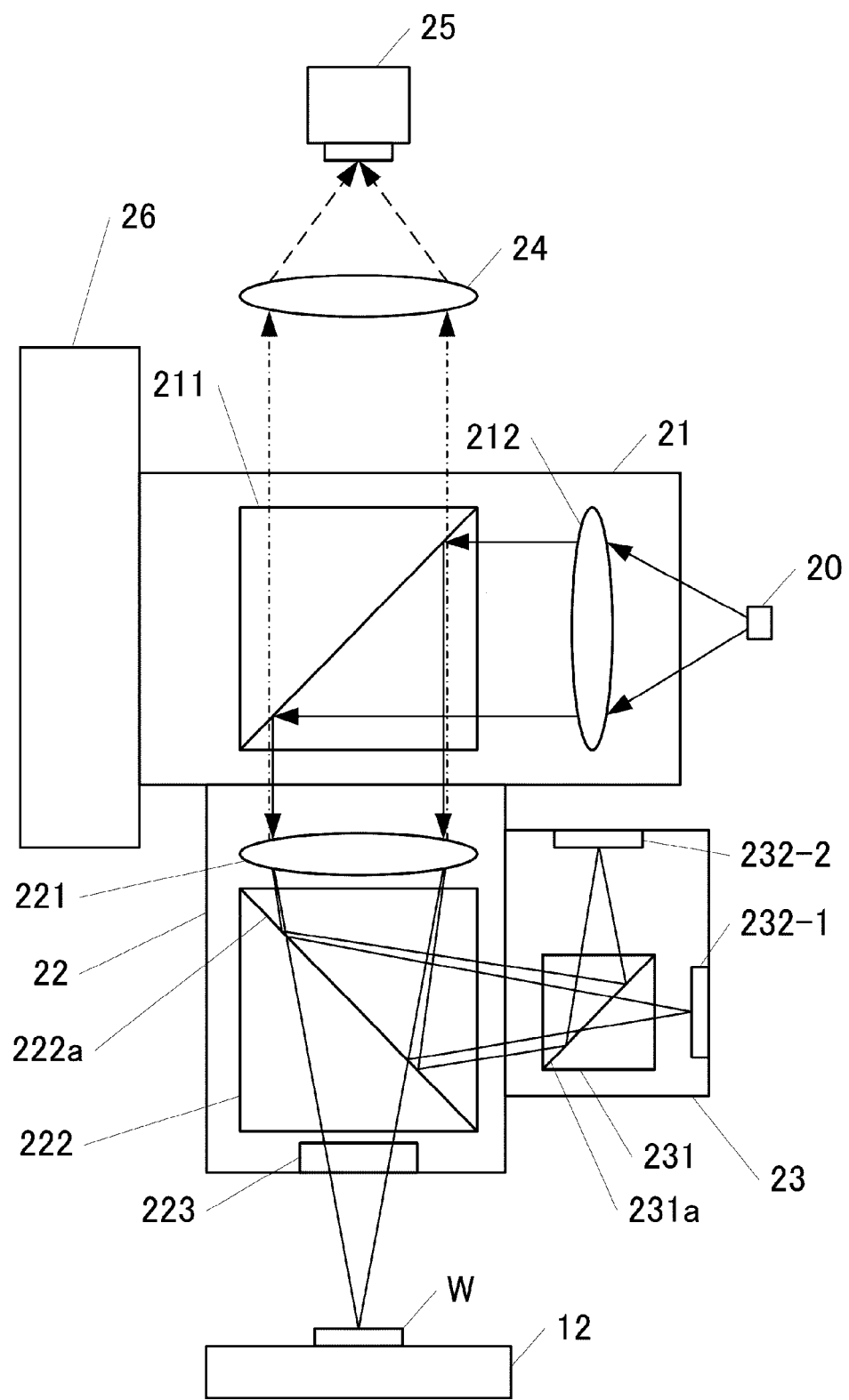
FIG. 2 is a schematic diagram showing the configuration of an interference optical head 152 together with optical paths.

FIG. 2 is a schematic diagram showing the configuration of the interference optical head 152 together with optical paths. The interference optical head 152 configures a Michelson interferometer, as shown in FIG. 2, and is provided with a light source part 20, an interference optical head part 21, an objective lens part 22, a reference mirror part 23, an image-forming lens 24, an imaging part 25 and a drive mechanism part 26.

The light source part 20 is provided with a light source that outputs low-coherence broadband light having a number of wavelength components over a broadband, and for example, a white light source such as a halogen light source, a light emitting diode (LED) or the like is used.

The interference optical head part 21 is provided with a beam splitter 211 and a collimator lens 212. The light output from the light source part 20 is delivered in a collimated manner to the beam splitter 211 via the collimator lens 212, from a direction perpendicular to an optical axis of the objective lens part 22. From the beam splitter 211, light is output along such optical axis and the collimated beam is delivered from above to the objective lens part 22.

The objective lens part 22 is provided with and configured by an objective lens 221, a beam splitter 222 and an optical path correction plate 223 or the like. At the objective lens part 22, when the collimated beam is input into the objective lens 221 from above, the input light becomes converging light at the objective lens 221, and the converging light is then input into a reflecting surface 222a inside the beam splitter 222. For the objective lens 221, a lens is used which has a focal depth deep enough to achieve a focused condition at both of two reference mirrors (i.e. a reference mirror 232-1 and a reference mirror 232-2), which will be described hereinafter.

The input light is diverged into reflection light (reference light) that travels through a reference optical path in the reference mirror part 23 and transmitted light (measurement light) that travels through a measurement optical path having a work piece W arranged therein. The reflection light is reflected at the reference mirror 232-1 and the reference mirror 232-2 provided in the reference mirror part 23, which will be described hereinafter, and then is further reflected by the reflecting surface 222a of the beam splitter 222. On the other hand, the transmitted light passes through the optical path collection plate 223 while it converges and is then reflected at the work piece W, and then goes back through the optical path collection plate 223 again and transmits through the reflecting surface 222a of the beam splitter 222. Here, the optical path correction plate 223 has equal optical properties to those of a beam splitter 231 provided in the reference mirror part 23 and cancels out the effect caused by arranging the beam splitter 231 in the reference optical path. The reflected light from the reference mirror part 23 and the reflected light from the work piece W become a combined wave by being combined by the reflecting surface 222a of the beam splitter 222.

The combined wave which is combined at the position of the reflecting surface 222a of the beam splitter 222 becomes a collimated beam at the objective lens 221, travels upwardly, and is then input into the image-forming lens 24 after passing through the interference optical head part 21 (denoted by a dashed-dotted line in FIG. 2). The image-forming lens 24 converges the combined wave and forms an interference image onto the imaging part 25.

The reference mirror part 23 is provided with a beam splitter 231, a reference mirror 232-1 and a reference mirror 232-2. The light that is diverged by the beam splitter 222 and travels along the reference optical path is input into a reflecting surface 231a inside the beam splitter 231. The input light is then diverged into transmitted light that transmits through the reflecting surface 231a and travels toward the reference mirror 232-1 and reflection light that is reflected by the reflecting surface 231a and travels toward the reference mirror 232-2. The light beams diverged by the beam splitter 231 are reflected by either the reference mirror 232-1 or the reference mirror 232-2 and are further combined by the reflecting surface 231a of the beam splitter 231. The light combined by reflecting surface 231a is input into the beam splitter 222 as reflection light from the reference mirror part 23. Hereinafter, an optical path along which the light transmitted through the reflecting surface 231a is reflected by the reference mirror 232-1 and returns to the beam splitter 231 will be referred to as a first optical path, and an optical path along which the light reflected from the reflecting surface 231a is reflected by the reference mirror 232-2 and returns to the beam splitter 231 will be referred to as a second optical path.

Figure 3:
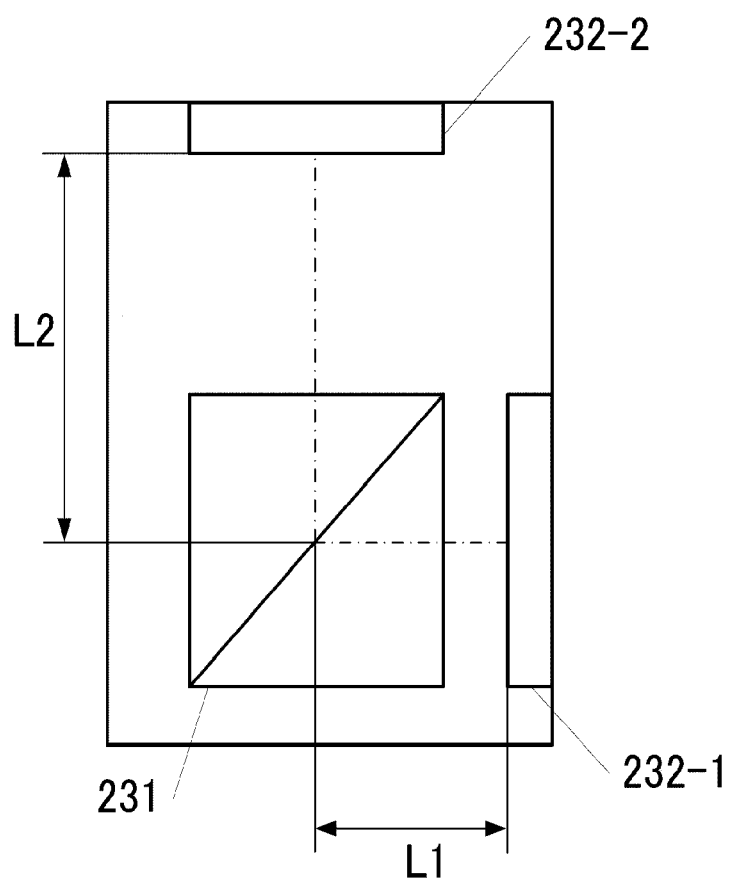
FIG. 3 is a relevant-part enlarged view of a reference mirror part 23.

FIG. 3 is a relevant-part enlarged view of the reference mirror part 23. The reference mirror 232-1 and the reference mirror 232-2 are arranged such that a distance L2 of the optical center from the beam splitter 231 to the reference mirror 232-2 is longer than a distance L1 of the optical center from the beam splitter 231 to the reference mirror 232-1 by an amount of h (i.e. L2−L1=h).

The imaging part 25 is a CCD camera, or the like, for configuring the imaging part and is comprised of two-dimensional imaging elements. The imaging part 25 images an interference image of the combined wave (i.e. the reflected light from the work piece W and the reflected light from the reference mirror part 23) output from the objective lens part 22. The data of such imaged image is then taken into the computer system 2.

Figure 4A:
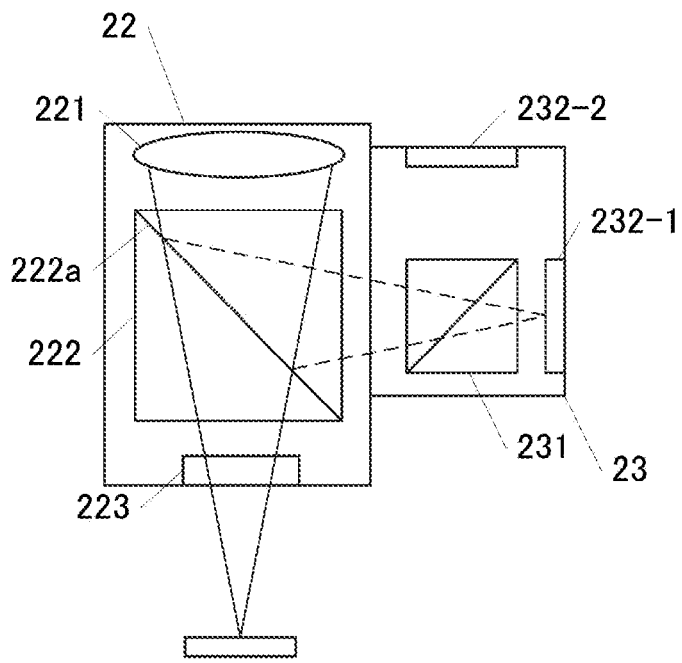
FIG. 4A and FIG. 4B are relevant-part enlarged views showing the configurations of an objective lens part 22 and a reference mirror part 23, measurement optical paths and reference optical paths.
Figure 4B:
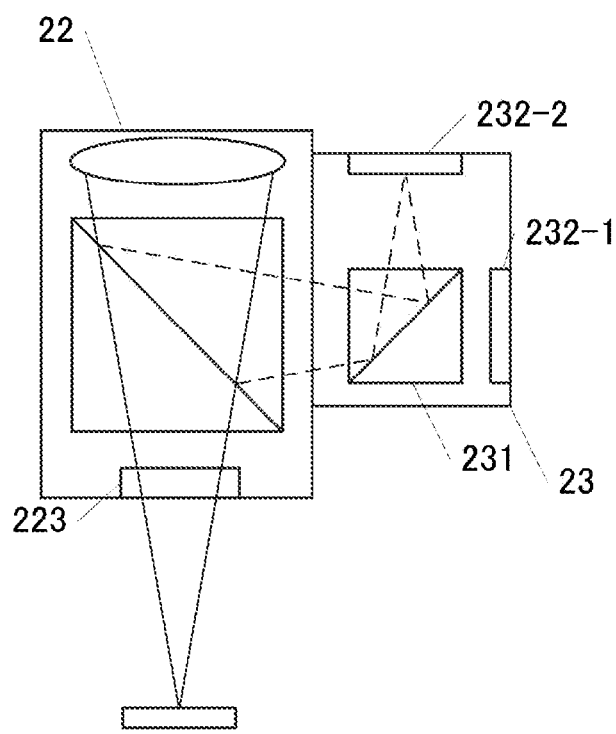

FIG. 4A and Fig.4B are relevant-part enlarged views of the objective lens part 22 and the reference mirror part 23. The drive mechanism part 26 corresponds to an optical path length varying part of the present invention and moves the interference optical head 152 in the optical axis direction based on a move command from the computer system 2. FIG. 4A shows a state in which the optical path lengths of the reference optical path (shown in broken line) that follows the first optical path and the measurement optical path (shown in solid line) are equal. FIG. 4B shows a state in which the optical path lengths of the reference optical path (shown in broken line) that follows the second optical path and the measurement optical path (shown in solid line) are equal. As shown in FIG. 4A and FIG. 4B, the reference light that travels along the first optical path interferes with the measurement light reflected at a higher position. When measurement is carried out, a number of interference images are obtained with differing measurement optical path lengths by capturing such interference images while moving the interference optical head 152 in the optical axis direction (i.e. Z-axis direction); however, interference is generated when the length of the measurement optical path matches the length of the reference optical path that follows either the first optical path or the second optical path. It should be noted that the case in which the interference optical head 152 is moved is illustrated in the above; however, a configuration in which the length of the measurement optical path is adjusted by moving the stage 12 is also possible. In addition, a configuration in which the length of the reference optical path is variable by moving the entire reference mirror part 23 in the direction of the optical axis prior to the divergence at the beam splitter 231 (i.e. in the horizontal direction in FIG. 4A and FIG. 4B) is also possible. As can be seen from the above, the optical path length of either the reference optical path or the measurement optical path is variable in the interference optical head 152.

Under control of the computer system 2, the interference optical head 152 is moved along the optical axis by the drive mechanism part 26. During such movement, the imaging part 25 captures images every time the interference optical head 152 moves for the predetermined distance. The interference images are taken into the computer system 2.

Returning back to FIG. 1, the computer system 2 is provided with a computer body 201, a keyboard 202, a joystick box (hereinafter referred to as a J/S) 203, a mouse 204 and a display 205

Figure 5:
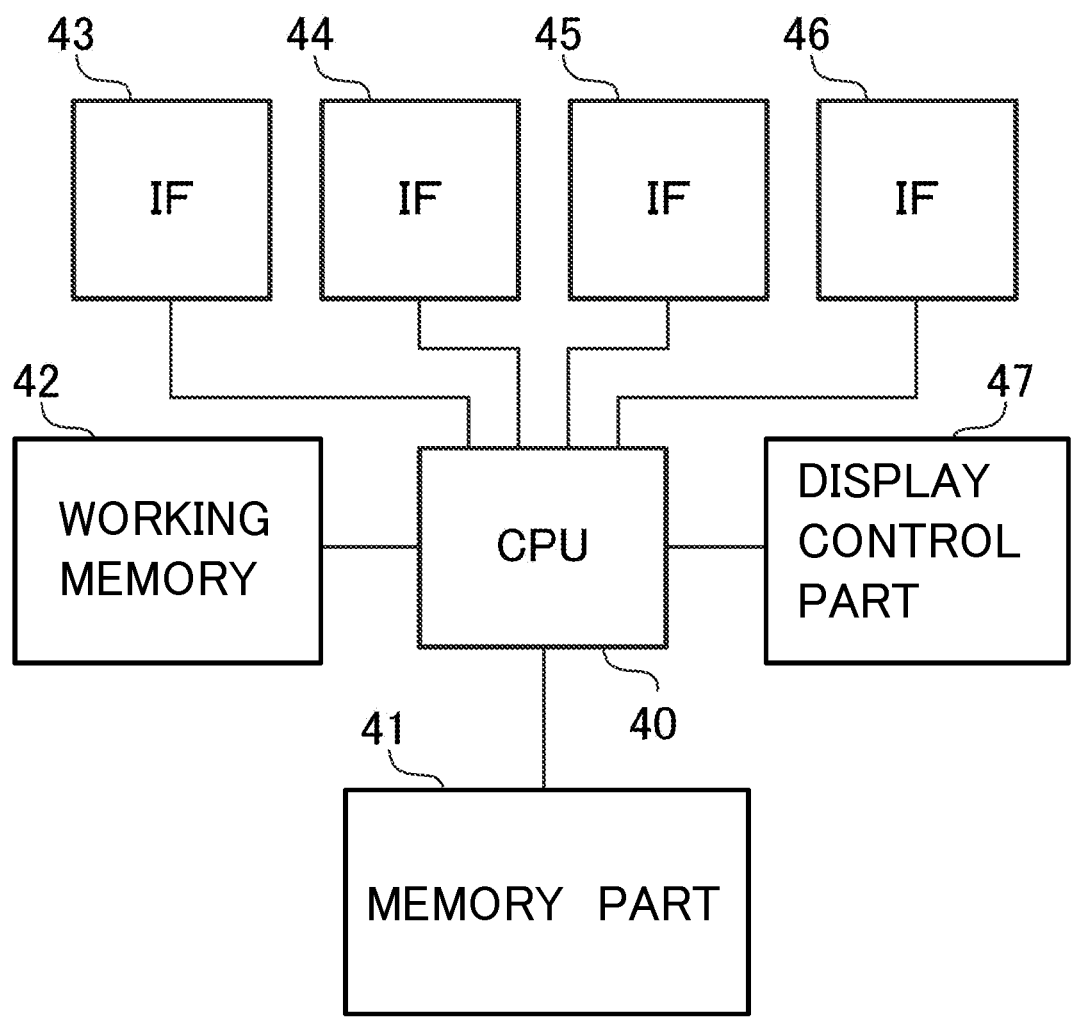
FIG. 5 is a block diagram showing the configuration of a computer body 201.

FIG. 5 is a block diagram showing the configuration of the computer body 201. As shown in FIG. 5, the computer body 201 is provided with a CPU 40 which forms a core of control, a memory part 41, a working memory 42, interfaces (denoted by "IF" in FIG. 5) 43, 44, 45, 46 and a display control part 47 that controls representation at a display 205.

An operator's instruction information input from the keyboard 202, the J/S 203 or the mouse 204 is input into the CPU 40 via the interface 43. The interface 44 is connected to the measuring device in which the interference optical system and the image measuring device are combined. The interface 44 supplies various control signals from the CPU 40 to the measuring device in which the interference optical system and the image measuring device are combined. The interface 44 also receives various kinds of status information and measurement results from the measuring device in which the interference optical system and the image measuring device are combined, and inputs them into the CPU 40.

When an image measurement mode is selected, the display control part 47 displays, on the display 205, an image based on an image signal supplied from the CCD camera of the image optical head 151. When an interference measurement mode is selected, the display control part 47 displays, in an appropriate manner, on the display 205, the image captured by the interference optical head 152, CAD data, the three-dimensional shape data measured by the interference optical head 152, or the like, based on the control by the CPU 40. The result of the measurement by the image optical head 151 or the interference optical head 152 can be output to a printer via the interface 45. In addition, the interface 46 converts the CAD data (design data) of the work piece W provided by an exterior CAD system or the like, which is not shown, into a predetermined format, and inputs the same into the computer system 2.

The working memory 42 provides a working area for various processing by the CPU 40. The memory part 41 is configured by, for example, a hard disk drive, a RAM, or the like and stores therein a program to be carried out by the CPU 40, and the result of measurement by means of the measuring device in which the interference optical system and the image measuring device are combined, and the like.

The CPU 40 carries out various types of processing including: switching between the image measurement mode by means of the image optical head 151 and the interference measurement mode by means of the interference optical head 152; specifying of the measurement range (the measurement field of view and the measurement range in the vertical direction); moving of the imaging unit 15 in the X-axis direction; moving of the stage 12 in the Y-axis direction; imaging of the two-dimensional images by means of the image optical head 151; measuring of the interference image by means of the interference optical head 152; calculating of the three-dimensional shape data, and the like, based on the various types of information input via the corresponding interfaces, the instructions from the operator and the programs stored in the memory part 41 and the like.

When three-dimensional shape data is to be calculated, the CPU 40 determines a height (namely, the Z-direction position) of the workpiece surface at each X-Y position in the measurement field of view by detecting the peak of interference signal (namely, the light intensity at each X-Y position caused by interference). In this way, the CPU 40 functions as a height calculation part in the present invention.

According to the present embodiment, the reflection light from the reference mirror part 23 includes the reflection light by the reference mirror 232-1 and the reflection light by the reference mirror 232-2. For this reason, in order to determine the height of the work piece W, it is necessary to discern whether the interference fringe originates from the reflection light by the reference mirror 232-1 or from the reflection light by the reference mirror 232-2.

Therefore, in the present embodiment, the CPU 40 discerns as to from which reference mirror comes the reflection light that generates the interference fringes, based on the optical path length which is determined by the scanned position of the interference optical head 152 set by the drive mechanism part 26. More specifically, when two interference fringes are included in the signal intensities obtained by performing the scanning, the CPU 40 discerns that the interference fringe generated at a lower scanned position originates from the reflection light from the reference mirror 232-1, which has a relatively short optical path length, and discerns that the interference fringe generated at a higher scanned position originates from the reflection light from the reference mirror 232-2. In respect of the height at which the interference fringes occur by both the reflection light from the reference mirror 232-1 and the reflection light from the reference mirror 232-2 due to the scanning, the same height can be obtained regardless of which of the interference fringes is used, and thus, the CPU 40 may determine the height by preferentially making use of the interference fringe generated by the reflection light from one of the reference mirrors (for example, the reference mirror 232-1).

In addition, when only one interference fringe is included in the signal intensities obtained by performing the scanning, the CPU 40 measures, after moving the position to be scanned in the positive or negative direction by the difference h in the distance from the beam splitter 231 to each reference mirrors, whether or not the interference fringe is generated in such position, and depending on the result, CPU 40 may discern as to from which reference mirror comes the reflection light that generates the interference fringes. For example, in the situation where only one interference fringe is included in the signal intensities obtained by performing the scanning, when the interference fringe is generated at the scanned position in which the interference optical head 152 is moved in the positive direction (i.e. upward) by h, it can be discerned that the interference fringe detected in the measurement range in the vertical direction is generated by the reflection light from the reference mirror 232-1, which has a relatively short length for the optical path along which the reference light travels.

Figure 6:
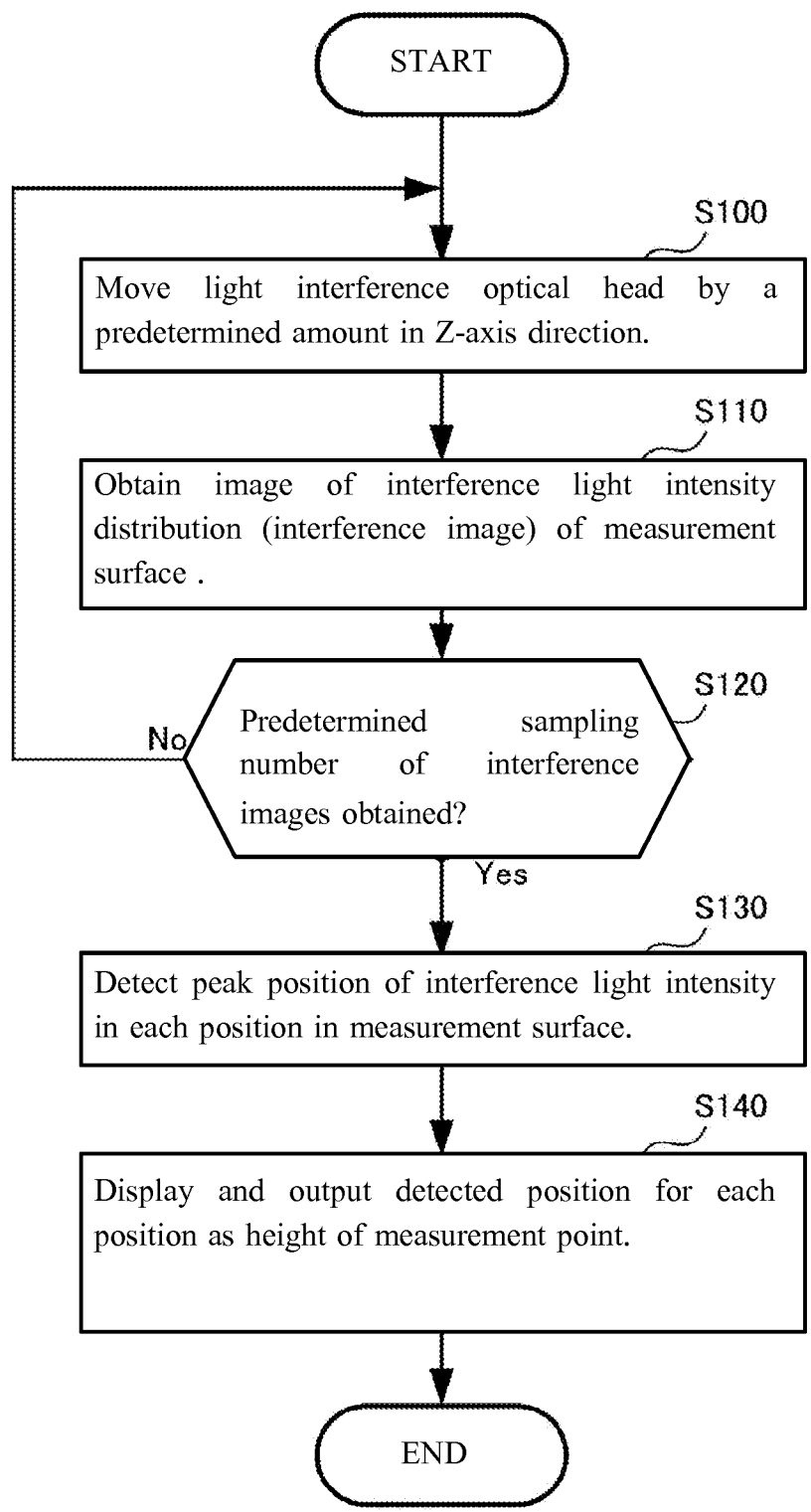
FIG. 6 is a flowchart illustrating the procedures of three-dimensional shape measurement using a measuring device of a first embodiment.

Subsequently, the procedures for measuring the three-dimensional shape of the work piece W using the measuring device of the present embodiment will be described with reference to the flowchart shown in FIG. 6. In the description below, the measurement range in the vertical (Z-axis) direction is set between 0 and H. In the measuring device, as described above, the difference between the distance from the beam splitter 231 to the reference mirror 232-1 and the distance from the beam splitter 231 to the reference mirror 232-2 is h.

Upon starting the three-dimensional shape measurement, the interference optical head 152 is moved by a predetermined amount in the optical axis direction (i.e. the Z-axis direction) (S100) and an interference image is imaged, which shows a two-dimensional distribution of the interference light intensities over a measurement surface (S110). When the above is repeated for a predetermined sampling number of times (S100 to S120) and a predetermined number of interference images is accumulated, the peak position in the interference signal is detected, which indicates the change in the intensity of the interference signal associated with the change in the optical path length difference, at each measurement position on the measurement surface (S130). The detected peak positions of the respective measurement positions are displayed and output as a height at the measurement point (S140).

Figure 7:
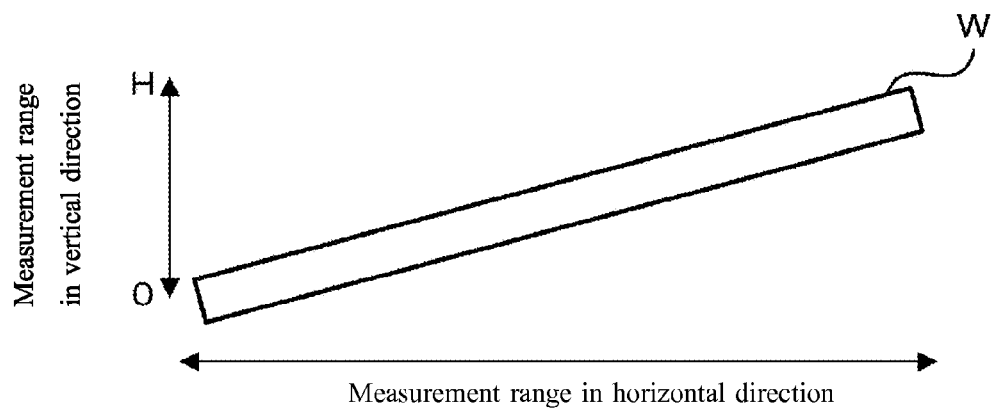
FIG. 7 is a schematic diagram showing the shape of a work piece W and a measurement range.
Figures 8A, 8B:
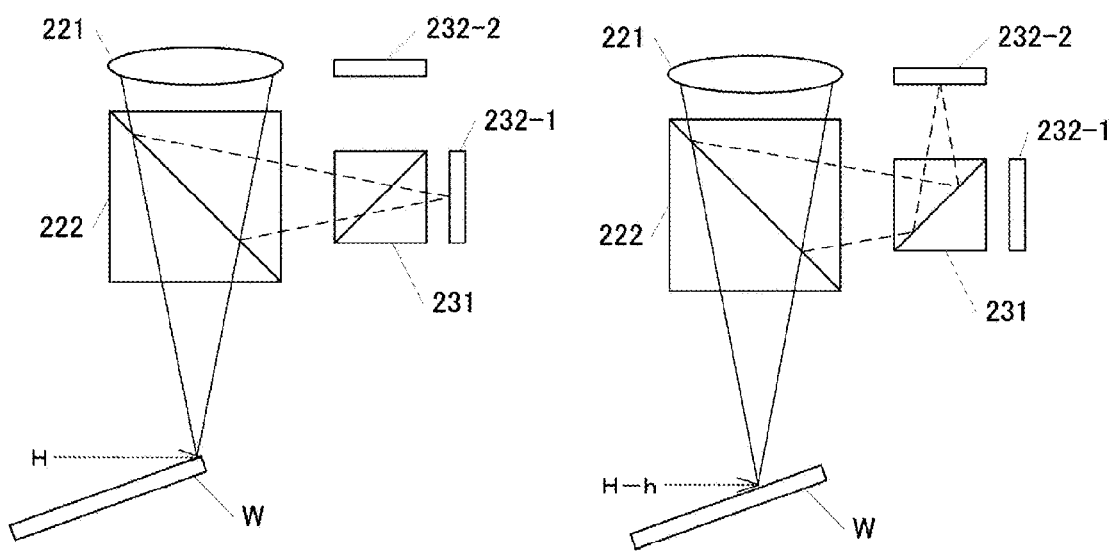
FIG. 8A is an optical path diagram showing the interference between reference light that has traveled along a first optical path and measurement light from the work piece W, immediately after the start of scanning.
FIG. 8B is an optical path diagram showing the interference between reference light that has traveled along a second optical path and measurement light from the work piece W, immediately after the start of scanning.
Figure 9:
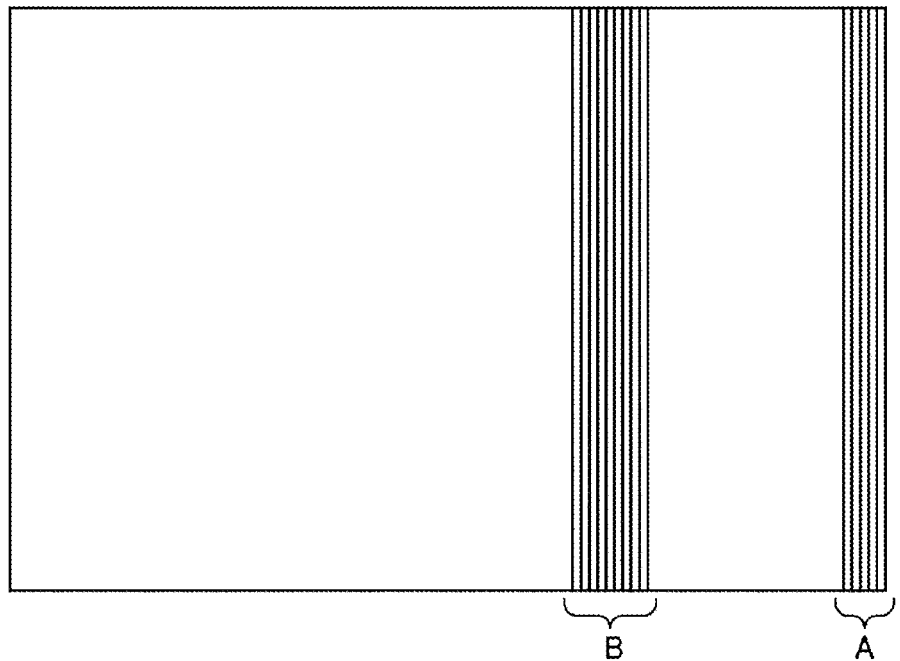
FIG. 9 is a schematic diagram of an interference image captured immediately after the start of scanning.

For example, as shown in FIG. 7, the case in which the three-dimensional shape of the work piece W with an inclined measurement surface is measured is assumed. FIG. 8A is an optical path diagram showing the interference between the reference light that has traveled along the first optical path and the measurement light from the work piece W, immediately after the start of scanning. FIG. 8B is an optical path diagram showing the interference between the reference light that has traveled along the second optical path and the measurement light from the work piece W, immediately after the start of scanning. As shown in FIG. 8A, the measurement light reflected in the vicinity of the upper end (i.e. a height H) of the measurement range matches the reference light that has traveled along the first optical path in terms of the optical path length and thus, interference is generated. On the other hand, as shown in FIG. 8B, the measurement light reflected in the vicinity of a height which is lower than the upper end of the measurement range by h (i.e. a height H-h) matches the reference light that has traveled along the second optical path in terms of the optical path length and thus, interference is generated. Accordingly, as shown in FIG. 9, in the interference images captured immediately after the start of scanning, the interference fringes are generated, in the measurement field of view, in the area where the height thereof is in the vicinity of H (area A in FIG. 9) and in the area where the height thereof is in the vicinity of H-h (area B in FIG. 9).

Figure 10A:
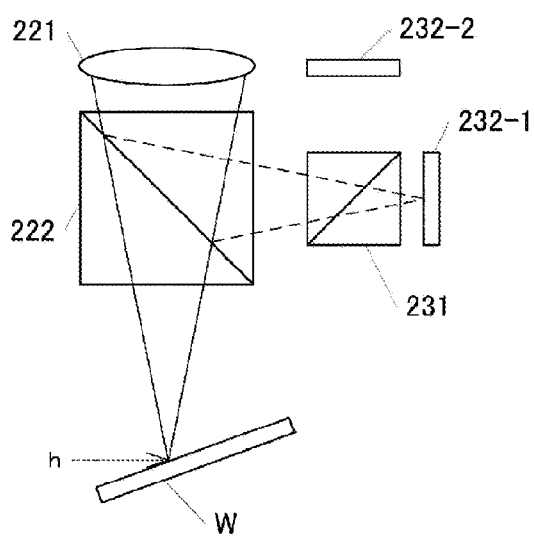
FIG. 10A is an optical path diagram showing the interference between the reference light that has traveled along the first optical path and the measurement light from the work piece W, immediately before the end of scanning.
Figure 10B:
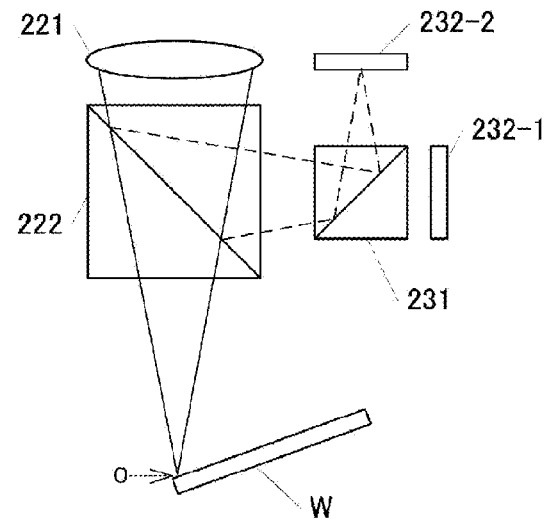
FIG. 10B is an optical path diagram showing the interference between the reference light that has traveled along the second optical path and the measurement light from the work piece W, immediately before the end of scanning.
Figure 11:
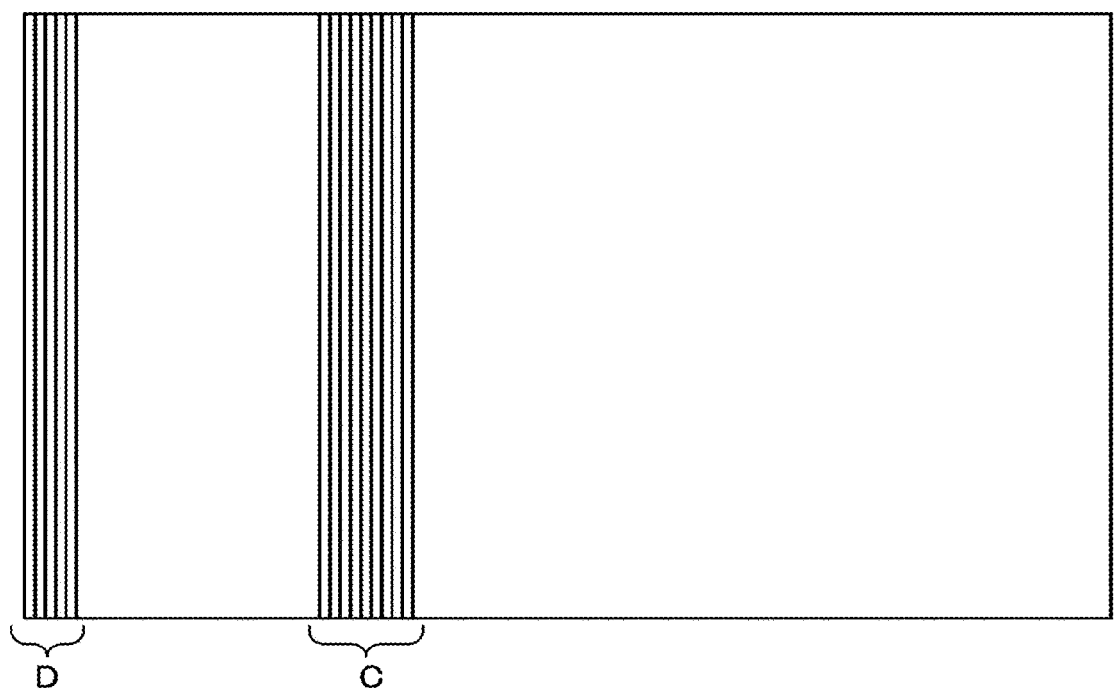
FIG. 11 is a schematic diagram of an interference image captured immediately before the end of scanning.

Subsequently, the interference images are captured in a repeated manner while moving the interference optical head 152 in a height-decreasing direction. FIG. 10A is an optical path diagram showing the interference between the reference light that has traveled along the first optical path and the measurement light from the work piece W, immediately before the end of scanning. FIG. 10B is an optical path diagram showing the interference between the reference light that has traveled along the second optical path and the measurement light from the work piece W, immediately before the end of scanning. As shown in FIG. 10A, the measurement light reflected in the vicinity of the height h matches the reference light that has traveled along the first optical path in terms of the optical path length and thus, interference is generated. On the other hand, as shown in FIG. 10B, the measurement light reflected in the vicinity of the height 0 matches the reference light that has traveled along the second optical path in terms of the optical path length and thus, interference is generated. Accordingly, as shown in FIG. 11, in the interference images captured immediately before the end of scanning, the interference fringes are generated, in the measurement field of view, in the area where the height thereof is in the vicinity of h (area C in FIG. 11) and in the area where the height thereof is in the vicinity of 0 (area D in FIG. 11).

As described above, in the scanning over the range of H-h, the reference light that has traveled along the first optical path interferes with the reflection light from the measurement surface with the height between h and H and the reference light that has traveled along the second optical path interferes with the reflection light from the measurement surface with the height between 0 and H-h. Accordingly, the measurement range from a height 0 to a height H can be covered by the scanning over the range of H-h. That is, since the scanning range can be made smaller than the measurement range by h, the number of interference images to be captured can be suppressed and, in turn, the measurement time can be reduced.

[Second Embodiment]

The features of the measuring device according to a second embodiment of the present invention lie in the method of distinguishing the interference fringes generated by the reflection light from the reference mirror 232-1 from the interference fringes generated by the reflection light from the reference mirror 232-2 and in the configuration for achieving such method. It should be noted that, other than the above, the measuring device is similar to the measuring device according to the first embodiment shown in FIGS. 1 to 5, and thus, the description will be omitted here.

According to the present embodiment, the measuring device provides a difference in intensity between the reference light that has traveled along the first optical path and the reference light that has traveled along the second optical path and thus, generates, as a result of the above, a difference in contrast (i.e. the light-dark amplitude) between the interference fringes generated by the reference light that has traveled along the first optical path and the interference fringes generated by the reference light that has traveled along the second optical path. Depending on whether such interference fringes have high or low contrast, it can be discerned as to along which optical path the reference light that generates the interference fringes has traveled. In particular, a difference may be provided between the transmittance and the reflectance of the beam splitter 231 provided in the reference mirror part 23 so as to provide a difference in intensity between the light that travels along the first optical path and the light that travels along the second optical path. As another approach, instead of providing a difference between the transmittance and the reflectance of the beam splitter 231, a difference may be provided between the reflectance of the reference mirror 232-1 and the reflectance of a second reference mirror so that a difference is generated between the light beams that are reflected by the respective reference mirrors and then return to the beam splitter 231. The CPU 40 can easily discern as to along which optical path the reference light that generates the interference fringes has traveled, based on the contrast, and can therefore determine the height of the measurement surface for each position in the measurement field of view.

[Third Embodiment]

The features of the measuring device according to a third embodiment of the present invention lie in the method of distinguishing the interference fringes generated by the reflection light from the reference mirror 232-1 from the interference fringes generated by the reflection light from the reference mirror 232-2 and in the configuration for achieving such method. It should be noted that, other than the above, the measuring device is similar to the measuring device according to the first embodiment shown in FIGS. 1 to 5, and thus, the description will be omitted here.

According to the present embodiment, the measuring device provides a difference in wavelength components between the reference light that has traveled along the first optical path and the reference light that has traveled along the second optical path and thus causes, as a result of the above, a difference in cycle between the interference fringes generated by the reference light that has traveled along the first optical path and the interference fringes generated by the reference light that has traveled along the second optical path. Depending on whether the cycle of the interference fringe is long or short, it can be discerned as to along which optical path the reference light that generates the interference fringes has traveled. In particular, an optical element having a different wavelength dependency may be arranged in each of the first optical path and the second optical path so as to provide a difference in wavelength component distribution between the light that travels along the first optical path and the light that travels along the second optical path. As for the optical element having a wavelength dependency, for example, an optical filter may be provided on the optical path or a mirror with reflectance depending on wavelengths may be used as the reference mirror 232-1 and the reference mirror 232-2. For example, in the configuration where the reference light that has traveled along the first optical path includes more long wavelength components, the cycle of interference fringes is larger for the reference light that has traveled along the first optical path, and thus, the CPU 40 can easily discern as to along which optical path the reference light that generates the interference fringes has traveled, based on the cycle of the interference fringes and can therefore determine the height of the measurement surface for each position in the measurement field of view. According to the present embodiment, since the cycle of the interference fringes can be predetermined independent of the intensities of the reference light and the measurement light, even when only one interference fringe is included in the signal intensities obtained by performing the scanning, it can be easily discerned as to along which optical path the reference light that generates the interference fringes has traveled.

[Fourth Embodiment]

Figure 12:
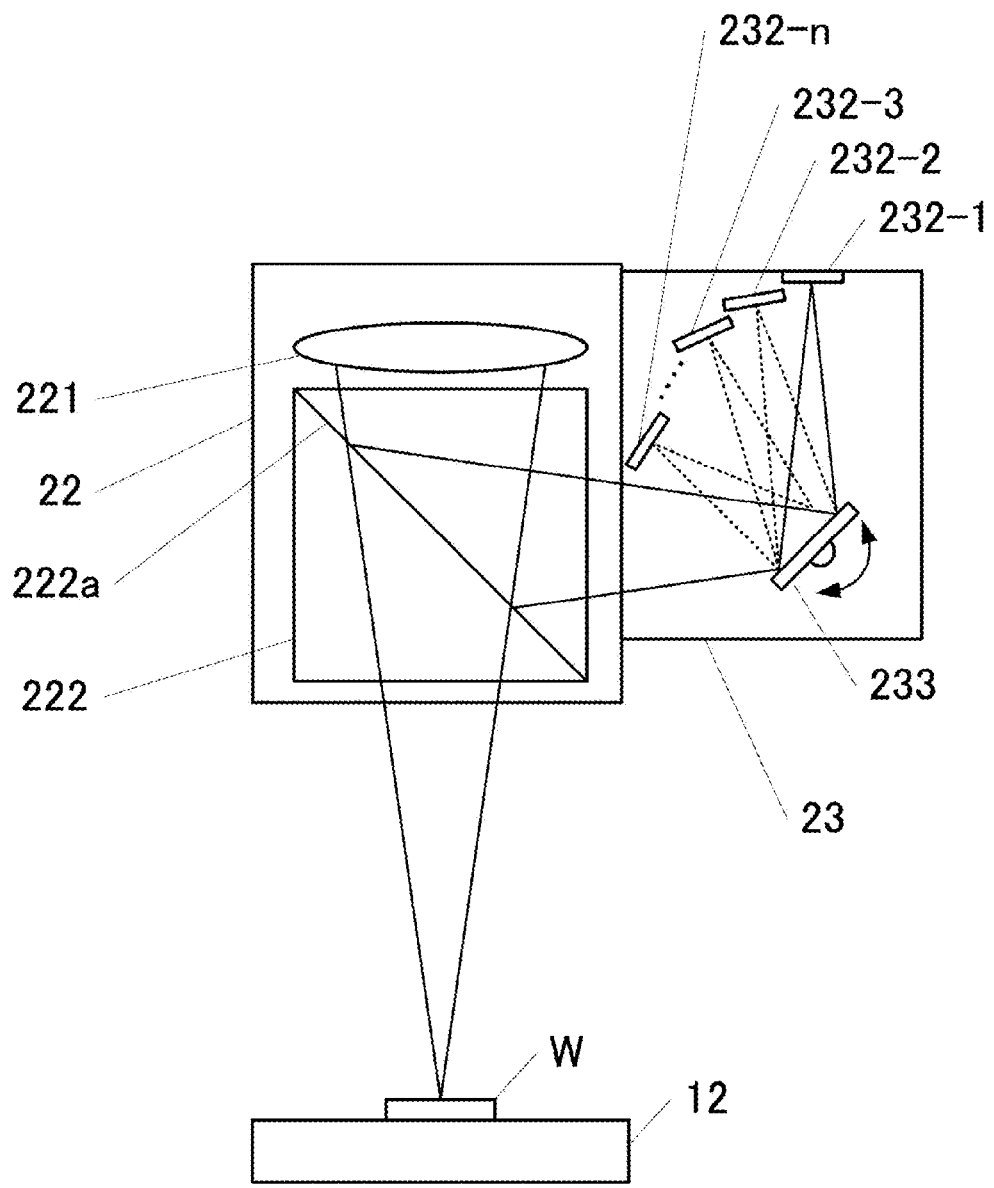
FIG. 12 is a schematic diagram showing the configurations of an objective lens part 22 and a reference mirror part 23 in the measuring device according to a fourth embodiment.

The features of the measuring device according to a fourth embodiment of the present invention lie in the points to the effect that, as shown in FIG. 12: the reference mirror part 23 is provided, in place of the beam splitter 231, with a drive mirror 233 that can vary the angle of the reflecting surface with respect to the input light axis; and n reference mirrors 232-1 to 232-n are arranged at positions where the distance from the drive mirror is different for each of such n reference mirrors. In addition, in association with the employment of the above configuration, the computer system 2 controls the angle of the drive mirror through the CPU 40. Further, the computer system 2 can discern the interference fringes generated by the reflection light from the n reference mirrors. It should be noted that, other than the above, the measuring device is similar to the measuring device according to the first embodiment shown in FIGS. 1 to 5, and thus, the description will be omitted here.

The drive mirror 233 changes the orientation (angle) through control by the CPU 40 and allows the light input from the objective lens part 22 to enter the plurality of reference mirrors 232-1 to 232-n in a sequential switching manner. The drive mirror 233 performs switching such that the reference light is allowed to enter all of the reference mirrors 232-1 to 232-n during a capturing cycle (i.e. a sampling cycle of the imaging element) when the imaging part 25 captures the interference images in a sequential manner. The reflection light beams from the respective reference mirrors 232-1 to 232-n are reflected toward the objective lens part 22 by means of the drive mirror 233 and become a combined wave by being combined with the reflection light from the work piece W by the reflecting surface 222a of the beam splitter 222. The reference light reflected toward the objective lens part 22 from the drive mirror 233 only includes the reflection light from any one of the reference mirrors corresponding to the angle of the drive mirror 233 at each point in time; however, by changing the angle of the drive mirror 233, the reflection light beams from all of the reference mirrors can be combined with the reflection light from the work piece W during one capturing cycle of the interference images, and thus, the reference light interferes with the reflection light from the measurement surface at a distance corresponding to the optical path that passes through a corresponding reference mirror.

The image of the combined wave combined at the position of the reflecting surface 222a of the beam splitter 222 is formed on the imaging part 25 via the objective lens 221, the interference optical head part 21, image-forming lens 24 or the like, and the interference image is captured by the imaging part 25. The height (i.e. the Z-direction position) at each position in the measurement field of view is determined by repeating the imaging by the imaging part 25 while scanning the position in the optical axis direction of the interference optical head 152 and by detecting the scanned position where the peak of the interference fringe occurs by analyzing image data of the interference image at each scanned position. At this time, the interference image includes n types of interference fringes generated by the reflection light from each of the reference mirrors 232-1 to 232-n; however, it is possible to discern as to from which reference mirror comes the reflection light that generates the interference fringes by the methods described in the above-described first to third embodiments. For example, when the discernment is to be made based on the difference in contrast of the interference fringes, the drive mirror 233 may provide a difference in length of time during which light is input into each of the reference mirrors 232-1 to 232-n and thus, a difference in contrast of the interference fringes may be caused.

[Variations of Embodiments]

It should be noted that the present invention is not limited to the embodiments described above and any variations, modifications and the like within a scope capable of achieving the object of the present invention are also included in the present invention.

Figure 13:
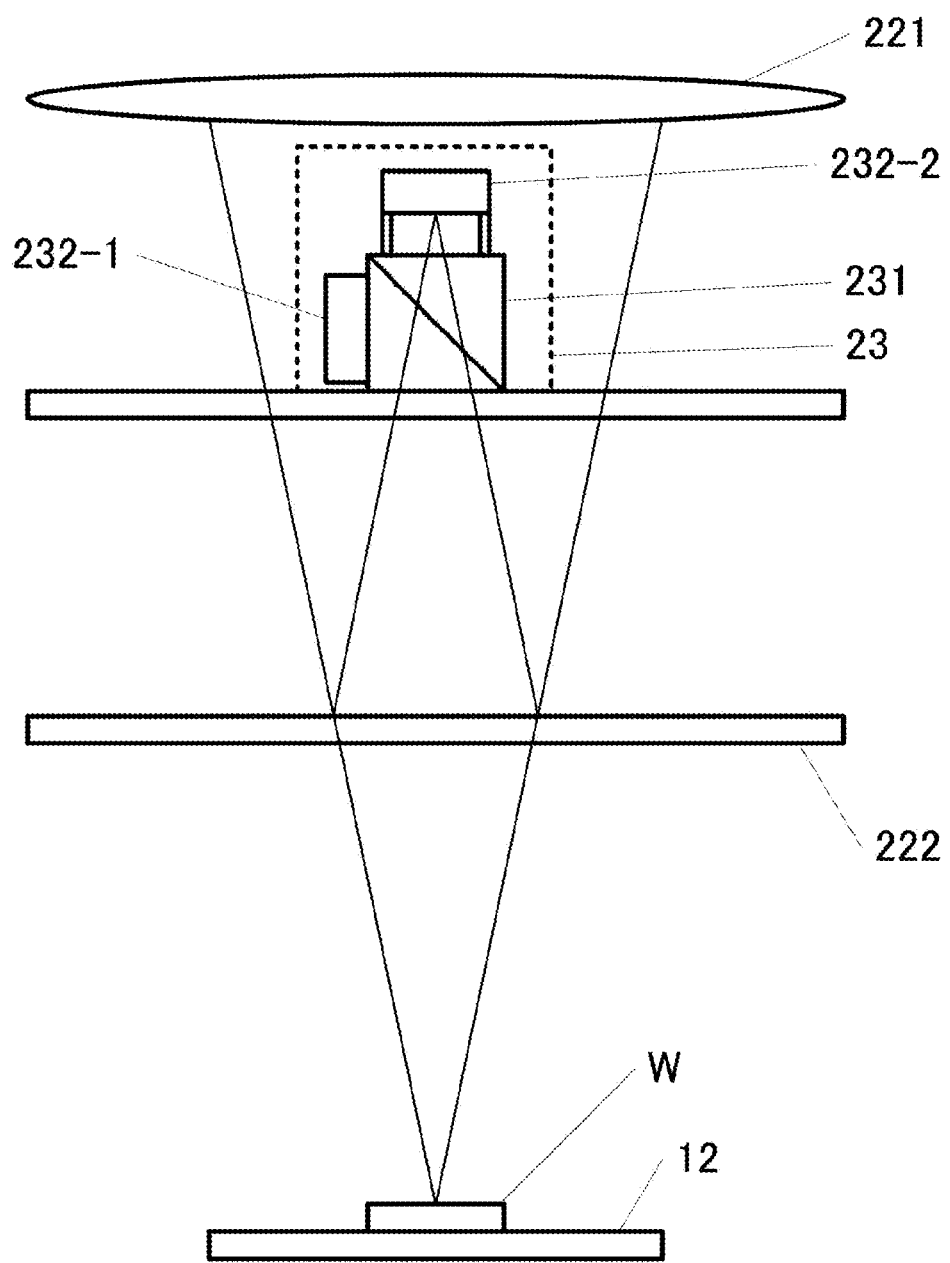
FIG. 13 is a schematic diagram showing the configuration of the case when the reference mirror part 23 in the first embodiment is applied to a Mirau interferometer.

For example, in the above-described embodiments, an example in which the image measuring device makes use of a Michelson interferometer is described; however, the present invention can also be applied to a measuring device that makes use of an interferometer other than the image measuring device, a microscope or the like. Further, the present invention can also be applied to a measuring device that makes use of a Mirau interferometer, a Fizeau interferometer, a Twyman-Green interferometer or any other equal optical path interferometer. For example, as shown in FIG. 13, the reference mirror part 23 in the first embodiment maybe applied to a Mirau equal optical path interferometer.

In addition, the methods of discerning interference fringes shown in the first to third embodiments may each be used alone or any of the methods many be combined.

INDUSTRIAL APPLICABILITY

The present invention is capable of reducing the number of interference images to be captured and is thus capable of reducing the measurement time by applying the present invention to the interference measuring device.

What is claimed is:

1. An interference measuring device comprising:
a light source that outputs light;
a first beam splitter that causes the light output from the light source to diverge into a reference optical path and a measurement optical path and that outputs a combined wave in which reflection light that has passed through the reference optical path and reflection light that has passed through a measuring object arranged in the measurement optical path are combined;
a reference light diverging part that is arranged in the reference optical path, that causes the light which is diverged into the reference optical path by the first beam splitter to further diverge into a plurality of optical paths, and that causes reflection light beams that have respectively passed through the plurality of optical paths to be input into the first beam splitter as the reflection light that has passed through the reference optical path;
a plurality of reference mirrors that are respectively arranged in the plurality of optical paths such that optical path lengths of the plurality of optical paths are different from each other, and that reflect reference light which is diverged by the reference light diverging part;
an optical path length varying part that varies an optical path length of either the reference optical path or the measurement optical path;
a camera that images, by two-dimensionally arranged plurality of light receiving elements, an interference image that shows a two-dimensional distribution of interference light intensities in the combined wave; and
a central processing unit (CPU) that determines a height of a measurement surface of the measuring target based on a plurality of interference images imaged by the camera at a plurality of optical path lengths which are varied by the optical path varying part,
wherein the reference light diverging part is a drive mirror that is capable of changing an angle thereof so as to sequentially reflect the light which is diverged into the reference optical path by the first beam splitter toward each of the plurality of reference mirrors.

2. The interference measuring device according to claim 1, wherein
the drive mirror changes the angle thereof so as to reflect the light which is diverged into the reference optical path by the first beam splitter toward all of the plurality of reference mirrors during one cycle in which the camera repeatedly images the interference images.

3. The interference measuring device according to claim 1, wherein
the CPU discerns as to from which one of the plurality of reference mirrors comes the reflection light that generates an interference fringe appearing in the interference image, based on an optical path length set by the optical path length varying part.

4. The interference measuring device according to claim 1, wherein
the CPU discerns as to from which one of the plurality of reference mirrors comes the reflection light that generates interference fringes appearing in the interference image, based on a contrast of the interference fringes.

5. The interference measuring device according to claim 1, wherein
concerning an interference fringe appearing on the interference image, the CPU recognizes as to from which one of the plurality of reference mirrors the reflection light comes, based on a bright-dark cycle of the interference fringe.

* * * * *